Aug. 12, 1958 W. W. ALLEN ET AL 2,847,579
CRYSTAL ORIENTER

Filed June 25, 1956 5 Sheets-Sheet 3

INVENTORS
WADE W. ALLEN
JOHN W. SHELL
BY
Woodhams, Blanchard and Flynn
ATTORNEYS Aug. 12, 1958 — W. W. ALLEN ET AL — 2,847,579
CRYSTAL ORIENTER Filed June 25, 1956 — 5 Sheets-Sheet 4

INVENTORS
WADE W. ALLEN
JOHN W. SHELL
BY
Woodhams, Blanchard & Flynn
ATTORNEYS

Aug. 12, 1958

W. W. ALLEN ET AL 2,847,579

CRYSTAL ORIENTER

Filed June 25, 1956

INVENTORS
WADE W. ALLEN
JOHN W. SHELL

BY

*Woodhams, Blanchard & Flynn*
ATTORNEYS

United States Patent Office 2,847,579
Patented Aug. 12, 1958

2,847,579

CRYSTAL ORIENTER

Wade W. Allen, Kalamazoo Township, Kalamazoo County, and John W. Shell, Kalamazoo County, Mich., assignors to The Upjohn Company, Kalamazoo, Mich., a corporation of Michigan Application June 25, 1956, Serial No. 593,489

14 Claims. (Cl. 250—52)

This invention relates in general to a method of determining by X-ray techniques the structure of a sample crystal and it relates also to an instrument for carrying out said method. It relates particularly to an apparatus by which the sample crystal may be prepared for study more quickly and easily than is possible by following previous practice.

In previous procedures for the determination of crystal structure by X-ray measurements, it has been conventional practice to use a device, such as the well-known Weissenberg X-ray diffraction goniometer, wherein the sample is located in the path of an X-ray beam and the X-rays diffracted by the planes within the crystal are received upon an X-ray sensitive film. Study of the exposure pattern on said film is then utilized to determine the molecular structure of the crystal and from this further desired information, such as the molecular weight of the material comprising the crystal, may be determined.

In carrying out these studies, it is desirable to position the crystal in the path of the X-ray beam in a number of different selected positions with respect to the X-ray beam in order to secure patterns on the exposed film which may be compared with each other in order to derive the desired information. In order to render the exposure patterns on the film as readily comparable as possible, it is desirable to arrange the film in a cylindrical shape, with the longitudinal axis thereof passing through both said crystal and said X-ray beam. Further, it is desirable to arrange the crystal so that, as it is moved into different positions during the exposure of a film, or a series of films, its movement from one position to another will constitute a rotation about a definite and identifiable one of its crystallographic axes. To accomplish this, it is evident that the crystal must be positioned with extreme precision, both with respect to the X-ray beam and with respect to the axis of the film holding device.

Prior practice relating to this problem consisted of visually determining the approximate location of the crystallographic axes of a crystal and then positioning the crystal with one selected crystallographic axis as close as possible to the desired position with respect to said beam and said film holder. One or more films were then exposed and studied. From the distortion of the normal diffraction pattern appearing on the film, it was then usually possible to calculate the distance that said selected axis of the crystal was displaced from the axis of the film holder (assuming the axis of the film holder to be coincident with the axis of the film when held thereby). From these calculations, it was then usually possible to determine the distance and direction that it was necessary to move the crystal in order to place said selected axis thereof coincident with the axis of the film holder.

However, since the exposure of the film often required several hours to accomplish, and the calculations above mentioned also required a substantial period of time, often a matter of hours, the total time required for positioning the sample so that its crystallographic axis was coincident with the axis of the film holder was often at least a half of a day and often much more. Particularly, if more than one exposure with the following calculations was required to effect the correct positioning of the sample, a great many hours, or even days, might be required.

Further, having in mind that this procedure must be repeated for each crystallographic axis of the crystal around which the crystal was to be moved in making X-ray studies, it will be appreciated that many days were often needed for completing the X-ray measurements, a great portion of which time constituted the steps between the visual, approximate locating of the sample and the final locating thereof in position for making the desired studies.

Therefore, it is, and for many years has been, highly desirable to devise a method, and apparatus for carrying out such method, by which a crystal, which has been visually examined and then located in approximately the desired position on a Weissenberg X-ray diffraction goniometer, or similar device, can be moved into the exact position required for carrying out the desired X-ray measurements without the serious expenditure of time which is required by previous practice.

Accordingly, a principal object of the invention is to provide a method for accurately and rapidly orienting a crystal which has been visually examined and mounted with one desired crystallographic axis thereof approximately coincident with the axis of the film holder in a Weissenberg X-ray diffraction goniometer, or similar apparatus, so that said crystallographic axis and the axis of such a film holder are precisely coincident, such coincidence being effected without the use of photographic procedures.

A further object of the invention has been to provide a method, as aforesaid, which can be carried out by relatively simple, but precise, apparatus.

A further object of the invention has been to provide apparatus for carrying out said method.

A further object of the invention has been to provide apparatus, capable of carrying out the method aforesaid, which is relatively simple and which is capable of being manufactured to close tolerances.

A further object of the invention has been to provide a method and apparatus, as aforesaid, which will be readily adaptable for use with a variety of crystals having widely varying characteristics, and which apparatus will function in the desired manner with respect to any desired axis of such crystals.

A further object of the invention has been to provide a device, which will cooperate with a commercially available Weissenberg X-ray diffraction goniometer, without requiring changes in the structure thereof.

A further object of the invention has been to provide a method and apparatus, as aforesaid, which can be readily modified for use with any device of the same general character, or designed for the same purposes, as the Weissenberg X-ray diffraction goniometer.

A further object of the invention has been to provide a method and apparatus, as aforesaid, which follows the same general procedures as are conventionally followed, including the initial, visual orientation of the crystal, in order that both the method and the apparatus can be performed by the crystallographer without requiring techniques which are radically different from those conventionally used.

A further object of the invention has been to provide a method and apparatus, as aforesaid, which can be used with complete accuracy, utilizing many already known techniques, and which will permit visual location of the selected crystallographic axis in coincidence with the axis of the film holder with such precision that no further adjustments will normally be required.

A further object of the invention has been to provide a device, as aforesaid, which can be made at a reasonable cost and which can be utilized over a long period of service with a high degree of accuracy and without requiring excessive maintenance.

Other objects and purposes of the invention will be apparent to persons acquainted with procedures and apparatus of this general character upon the reading of the following specification and examination of the accompanying drawings, in which:

Figures 12, 12a, 13 and 13a are schematic views of a crystal disposed in several different positions with respect to a graticule or reference line.

Figure 1:
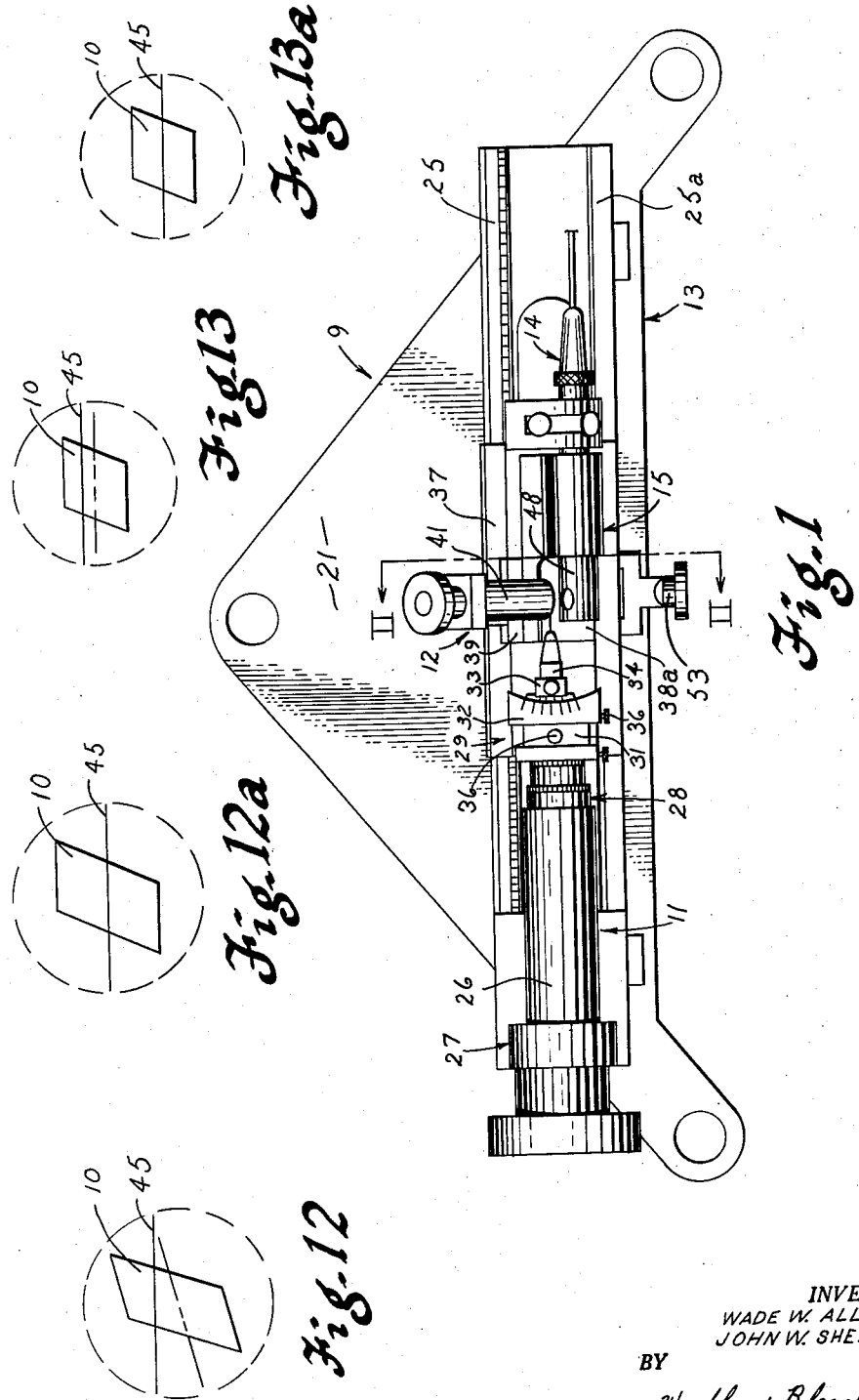
Figure 1 is a top plan view of an apparatus embodying the structure to which this invention relates.

For the purposes of convenience in description, the terms "left," "right," "front," "rear," and derivatives thereof, will have reference to the structure and parts thereof, as appearing in Figure 1. The terms "upper," "lower," and derivatives thereof, will have reference to said structure as appearing in Figure 2. The terms "inner," "outer," and derivatives thereof, will have reference to the geometric center of said structure and/or the parts thereof being discussed.

General description

In order to meet the objects and purposes set forth above, there has been provided an improved method of positioning a crystal, and an apparatus for performing such method, whereby a crystal is mounted upon an adjustable support device and a selected crystallographic axis thereof is oriented in a position of coincidence with a reference axis, by visually observing said crystal through an optical system, while manually directing the orientation thereof.

Figure 4:
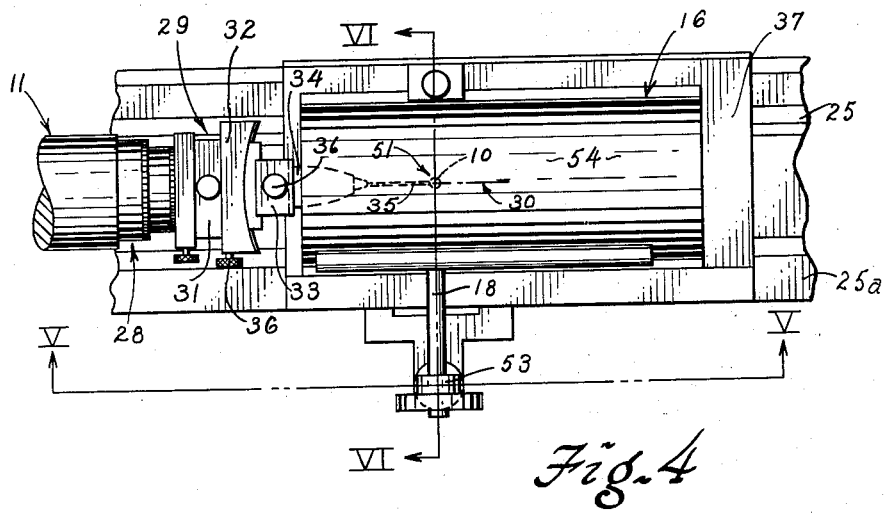
Figure 4 is a fragment of Figure 1, showing a film and film holder in place of the optics and light source, and the collimator in position.

The crystal support device 11 and the optical system 12 are mounted upon a base structure 13, which, in this particular embodiment, is the base structure of a Weissenberg X-ray diffraction goniometer. A light source 14 and a light director 15 are mounted upon said base structure 13 for the purpose of illuminating the crystal 10 when it is held by the device 11. After the selected axis of the crystal 10 has been caused to precisely coincide with the reference axis of the apparatus 9 by adjusting the device 11, the optical system 12, the light source 14, and the light director 15 are removed from the base structure 13 and replaced by a film holder 16 (Figure 4), upon which a film 17 is mounted. In this particular embodiment, the film is substantially cylindrical and has its longitudinal axis coincident with said reference axis. X-ray radiation is then caused to pass through the X-ray director tube or collimator 18, which is pointed at the crystal 10. The device 11 then may be rotated to successive positions during the exposure operation, thereby causing the crystal 10 to rotate about its selected axis and expose successive sections of the film 16, or successive films, or proceed in any other manner available with the apparatus being used.

Detailed construction

In order to fully and clearly describe the invention, it is desirable to describe first the relevant part of the structure of the presently available, and conventional, Weissenberg goniometer in connection with which the invention may be used. It should be understood, however, that said Weissenberg goniometer forms no part of the present invention, and the following description of a Weissenberg goniometer is set forth solely for convenience in reference and to effect more clearly and easily a complete disclosure of the invention. Further, it should also be clearly understood that while the invention was particularly worked out in connection with a Weissenberg goniometer, and is for convenience herein disclosed in connection with a Weissenberg goniometer, it is by no means solely or even principally limited thereto. Accordingly, the specific reference herein to a Weissenberg goniometer should be understood as illustrative only and not limiting.

Figure 2:
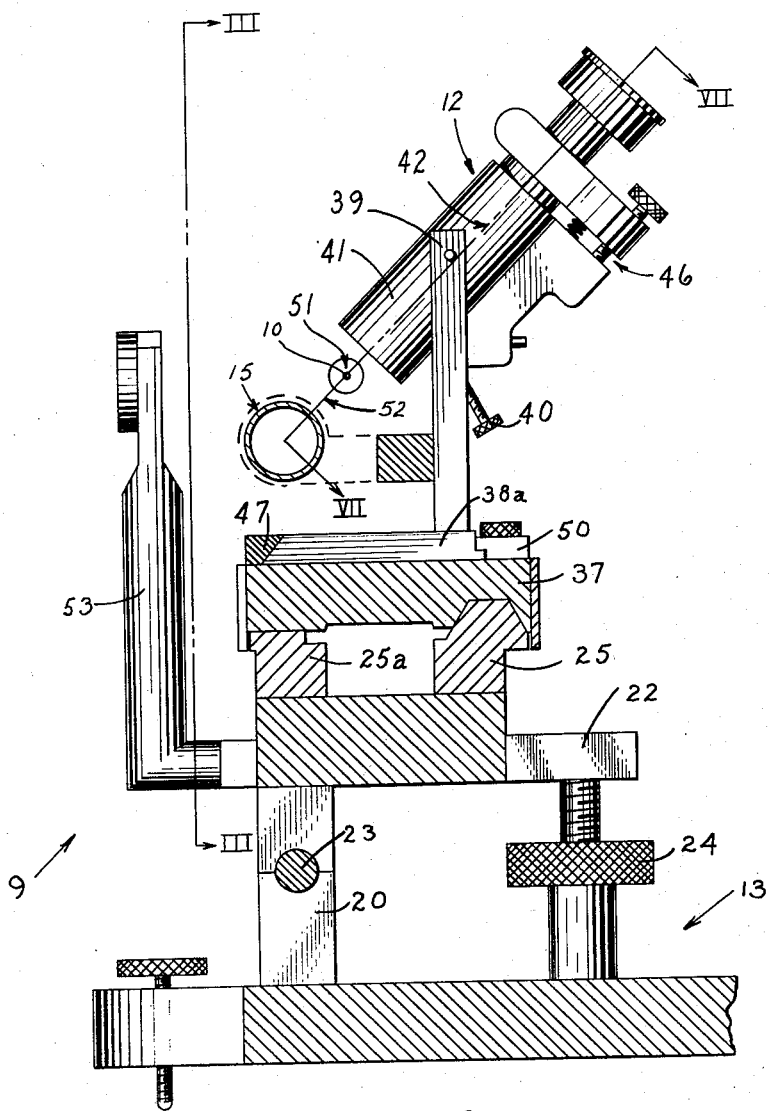
Figure 2 is a sectional view taken along the line II—II of Figure 1.
Figure 5:
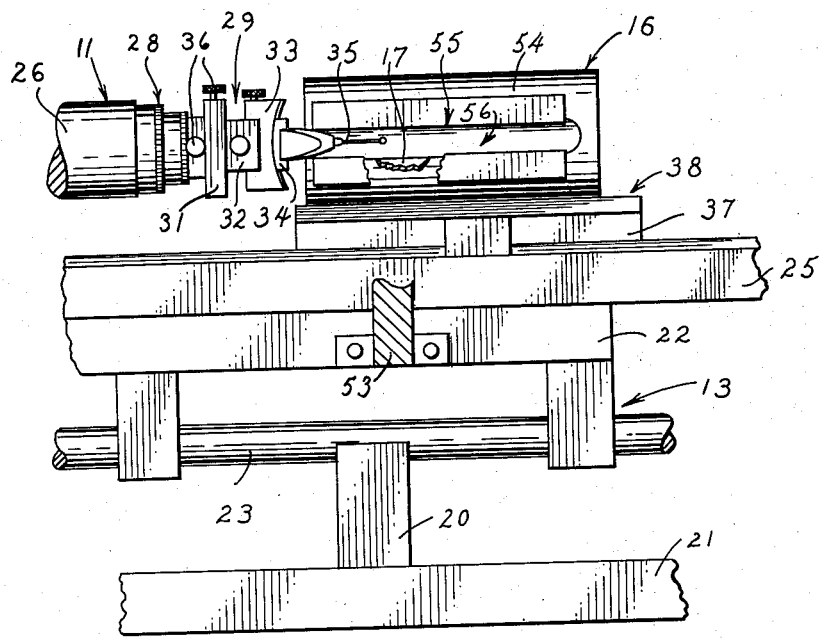
Figure 5 is a sectional view taken along the line V—V of Figure 4.

As shown in Figures 1, 2 and 5, the base structure 13 of the apparatus 9 has a triangular base plate 21, preferably equipped with some convenient means for leveling same. A mounting plate 22 is pivotally supported with respect to the base plate 21 by means of a horizontally disposed pivot shaft 23, said shaft being pivotally supported by blocks, of which one is shown at 20, which are mounted on said base plate. Means, such as the adjustment screw 24, may be provided for effecting adjusting movement of said mounting plate 22 around said pivot shaft 23 with respect to said base plate 21. Elongated ways 25 and 25a are secured to, and supported upon, the mounting plate 22 with the longitudinal axes of said ways substantially parallel with the axis of said pivot shaft 23.

The adjustable support device 11 has a cylindrical casing 26, the longitudinal axis of which is parallel with, and directly above, the longitudinal axes of the ways 25 and 25a. The leftward end of the casing 26 is secured to a support member 27, which is in turn secured to, and mounted upon, the leftward end of the mounting plate 22. Said support device 11 also includes an adjustment core 28 rotatably and adjustably supported within the cylindrical casing 26, and extending from the rightward end thereof. The axis of rotation of the adjustment core 28 shall be hereinafter referred to as the "reference axis 30" of the apparatus 9. An adjustment head 29 is secured to said rightward end of said core 28.

Figure 6:
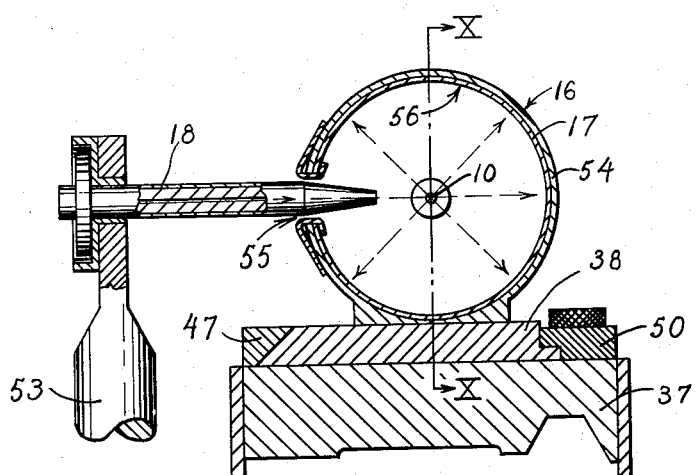
Figure 6 is a sectional view taken along the line VI—VI of Figure 4.
Figure 7:
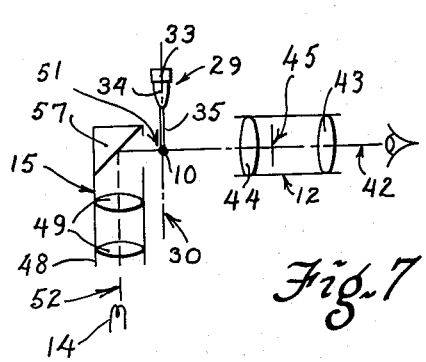
Figure 7 is a schematic view taken along the cutting line VII—VII of Figure 2.

The adjustment head 29 is comprised of a plurality, here four, of adjustment blocks 31, 32, 33 and 34, which are adjustably supported one upon the other, the first adjustment block 31 being secured to said adjustment core 28. In this particular embodiment and in the position of the core 28 shown in the drawings, the adjustment blocks 32 and 34 are vertically adjustable with respect to the axis 30 of said core 28, whereas the adjustment blocks 31 and 33 are adjustable horizontally with respect to said core axis, although it will be recognized that all of the adjustment blocks together with their directions of adjustment will rotate with rotation of the core 28 and hence this reference to "vertical" and "horizontal" adjustment is solely for convenience in reference. However, both said adjustment blocks 33 and 34 are movable with respect to the adjacent blocks 31 and 32, respectively, along an arcuate path, the center of such path being on an axis intersecting the axis 30 of the cylindrical casing 26. A crystal support element 35 is mounted upon, and extends rightwardly from, the adjustment block 34. Thus, by appropriate rotational adjustment of the core 28 and suitable adjustment of the blocks 31, 32, 33 and 34, it is possible to cause the crystal 10 to be oriented, as desired or required, within very wide limits. As shown in Figures 6 and 7, the crystal support element 35 may be a single rod extending from said block 34, or a combination of two or more such rods secured to each other. The support element may advantageously be made of amorphous material and, in many cases, is a glass fiber. The adjusting of the adjustment blocks 31, 32, 33 and 34 may be effected by means of adjustment screws 36 in a substantially conventional manner.

Figure 11:
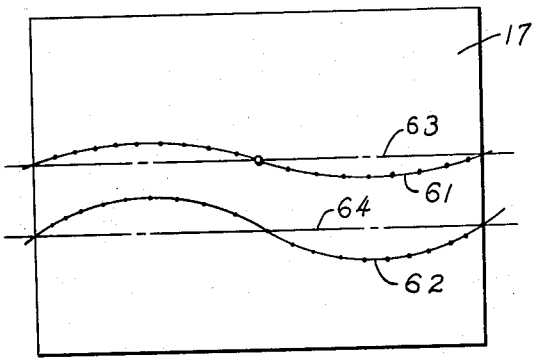
Figure 11 is a plan view of a sheet of exposed film removed from a holder as shown in Figure 6.
Figure 9:
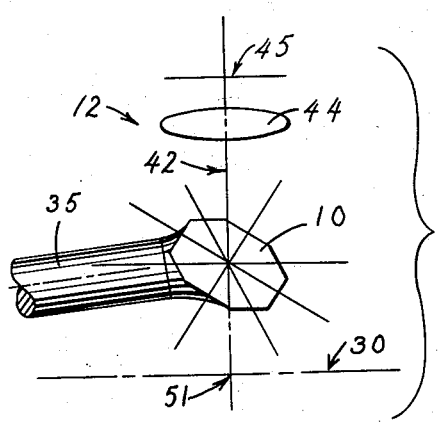
Figure 9 is an enlargement of a portion of Figure 7.
Figure 10:
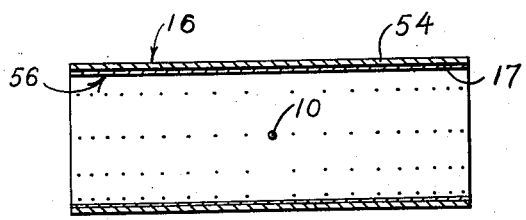
Figure 10 is a sectional view taken along the line X—X of Figure 6.

A support skid 37 is secured upon the ways 25 and 25a and is adjustable lengthwise thereof, and the film holder 16 has a support 38 mounted upon the support skid 37. Said film holder is provided with a cylindrical shell 54 (Figure 4), which is coaxial with the reference axis 30 when said film holder support 38 is properly positioned on the skid 37. The shell 54 is provided with an elongated slot 55 (Figure 6) through its periphery and aligned parallel with the axis of the film holder. The slot 55 is so positioned that X-ray radiation emanating from the X-ray director tube 18 will pass through said slot 55 into the interior of the shell 54. A film 17, suitably sensitized on its interior surface 56, is slidably disposable within the shell 54, with its ends lying close to each side of the slot 55. Thus, radiation passing through the tube 18 and the slot 55 will impinge upon the crystal 10 and then be redirected by said crystal onto the sensitized inner surface 56 of the film 17 to register a permanent record of the structure of said crystal in a known manner and as shown in Figures 10 and 11.

Figure 8:
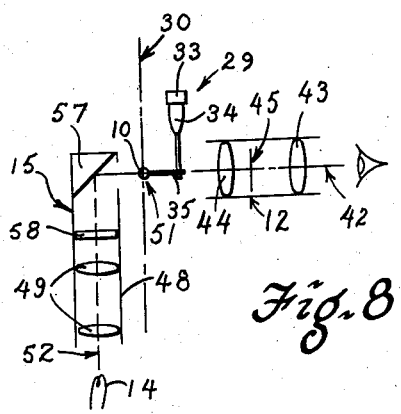
Figure 8 is a schematic view, also taken along the cutting line VII—VII in Figure 2, but showing a different position of the crystal supporting device.

The X-ray director tube or collimator 18 is preferably supported, as by means of a post 53 mounted upon the front end of the mounting plate 22, so that the axis of said X-ray director tube passes through said reference axis 30 at an intersection point 51 (Figures 7 and 8).

While said support skid 37 could conceivably be made removable, normally, in the interest of the accuracy of other control apparatus (not shown) which is normally used with a goniometer of this type, the skid 37 will be arranged permanently on the ways 25 and 25a. The film holder will normally be mounted upon the film holder support 38 which is then removably secured upon the skid 37 by, and between, the undercut rail 47 and the clamp 50.

The foregoing description has dealt solely with the structure of a standard Weissenberg goniometer and it will be understood that this is set forth merely to illustrate the invention. It will also be recognized that the invention may be used with other devices of this general character and that the selection of the Weissenberg goniometer is solely for the purpose of illustrating the invention and is not to be taken in any sense as limiting.

Turning now to the structure comprising the invention, an optical system support 38a (Figure 2) is removably and adjustably supported upon the skid 37 when the film holder support 38 (Figure 6) is removed from said skid 37. The optical support 38a will be held by, and between, the rail 47 and clamp 50 in the same manner as the film holder support 38.

Figure 3:
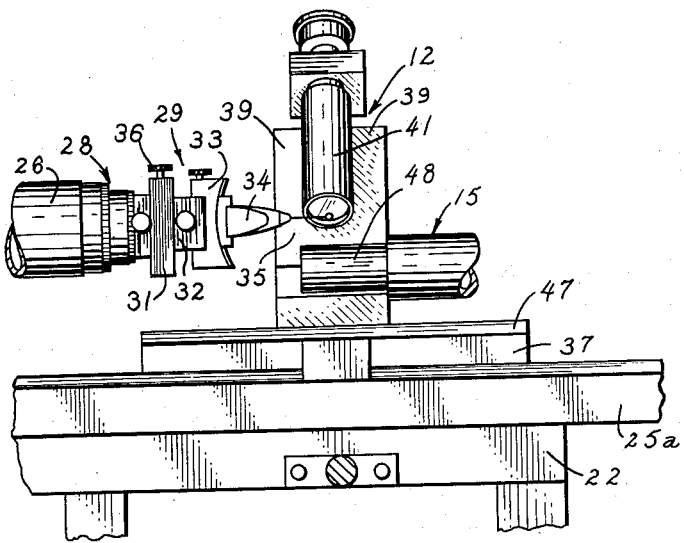
Figure 3 is a sectional view taken along the line III—III of Figure 2.

The optical support 38a includes a pair of upright support elements 39 (Figures 1, 2 and 3) upon, and between, which an optics tube 41, such as the casing of a microscope, is pivotally supported for movement about a horizontal axis, which is transverse of the line of sight 42 (Figures 2 and 7) of said optics tube 41. Normally, said tube 41 is positioned so that its line of sight 42 (Figure 7) intersects the reference axis 30 of the apparatus approximately at said intersection point 51. An adjustment screw 40 is mounted on the optical support 38a for adjusting the position of the tube 41 and its line of sight 42 with respect to the axis 30. The optics tube 41 contains lenses 43 and 44 of a conventional type, which are focused upon, and magnify the appearance of, any object, such as the crystal 10, located at the intersection point 51 of said center line of sight 42 and the reference axis 30. A reference line, or graticule, 45 (Figure 7) which appears to be a straight line when viewed through the optics tube 41, is provided within said tube, here between the lenses 43 and 44. Such graticule is located so that it is parallel with said reference axis 30 when the center line of sight 42 intersects said reference axis. Conventional adjustment mechanism 46 is provided for focusing the optical system 12.

The light source 14 is mounted upon the optical support 38a. The light director 15 includes a tube 48 containing optical elements 49 and a light directing device 57 (Figures 7 and 8), as a prism or plane mirror, for focusing and directing the beam 52 from the light source 14 upon the intersection point 51 of said reference axis 30 and said center line of sight 42. The light beam 52 from said light source 14 will normally and advantageously pass through said intersection point 51 in a direction coaxial with said center line of sight. Thus, the edges, and other details, of the crystal being examined through the optics tube 41 will be clearly apparent to the viewer thereof. The light beam 52 striking the intersection point 51 may be polarized, whenever desired, in any convenient manner, such as by a polarizing disk 58 (Figure 8) located adjacent a lens 49.

*Operation*

As in the case of previous methods and apparatuses of this general type for determining the structure of a crystal, said crystal is first mounted upon a support element 35, held by any convenient means, and visually examined to determine approximately the location of the principal axes of the crystal in their relationship to the support element 35. Then, depending upon the location of a selected axis of the crystal, said support element is secured to the rightwardmost (as appearing in Figures 1, 3, 4 and 5) adjustment block 34 on the adjustment head 29 so that said crystal is located as close to the intersection point 51 as is possible by manual positioning and while observing with the unaided eye. This preliminary orienting may, and usually does, require some preliminary and approximate adjustments of the adjustment blocks 31, 32, 33 and 34 by means of the adjustment screws 36 associated with said blocks.

If a film were exposed at this point in the operation, as is now conventional practice, it can be assumed that the selected crystallographic axis is not coincident with the axis 30 and, accordingly, the pattern on the film will be distorted. The results of such distortion, with the crystal under actual conditions, is illustrated by Figure 11 wherein the curved lines 61 and 62 would, if the crystal were properly positioned, be straight lines indicated by the dashed lines 63 and 64, respectively. Thus, in conventional practice it would be necessary next to measure the displacement of selected portions of said lines 61 and 62, such as the dots located on each of said lines, from the corresponding base lines 63 and 64, and utilize these measurements for determining the amount and direction of displacement of the selected crystallographic axis from the axis 30.

However, with the method and apparatus of the invention, the visual positioning of the crystal, as above described, is followed by further study thereof under the microscope provided by the optical system 12 and further visual correction of the location of the crystal with respect to the axis 30. To accomplish this, the optics support 38a, including the optical system 12, the light source 14, and the light director 15, may be mounted upon the support skid 37, either before or after the said preliminary adjustments are made with respect to the position of the crystal 10. In any case, it is then generally necessary to locate the optics tube 41 by moving the optics support 38a lengthwise of the support skid 37, or by moving the support skid lengthwise of the ways 25 and 25a, so that the center line of sight 42 lies substantially within a vertical plane passing through the crystal 10.

The optics tube 41 is then adjusted, if necessary, by the adjustment screw 40, so that the center line of sight 42 intersects the reference axis 30 and, somewhat simultaneously, the optical system will be focused by the focusing mechanism 46 to provide a clearer presentation of the crystal. Lastly, at least by way of illustration but not always in all circumstances of the actual handling of the apparatus, the light director 15 will be positioned to focus the light from the source 14 upon the crystal.

An edge of the crystal will normally be used as a reference line for locating the crystal in the proper position for making the desired X-ray studies. In accomplishing this, the desired crystallographic axis will be located by techniques now known, such as by visually estimating a distance, or a proportion of distance, between parallel edges, such as half-way between said edges, or by visually locating a line connecting selected corners of the crystal. These several possibilities and techniques are well known to persons skilled in the art and, accordingly, need not be further detailed, but for purposes of further illustration it will be assumed that an orthorhombic crystal is involved, namely, one having the selected axis between and parallel with a pair of selected parallel edges.

With said optics support 38a properly positioned upon the ways 25 and 25a, the graticule or reference line 45 will be parallel with said reference axis 30. Thus, the first operation will be to align one of the selected edges of the crystal 10 with the graticule 45 by appropriate manipulation of the adjustment screws 36 on the adjustment head 29. Figures 12 and 12a show, respectively, the position of a typical crystal of this type with respect to the graticule in both the original position and the aligned position resulting from this step.

It is now known that the desired crystallographic axis is parallel with the graticule and with the reference axis 30, but said desired axis is not necessarily coincident with said reference axis. To correct this, the adjustment core 28 within the cylindrical casing 26 of the adjustment support device 11, is now slowly rotated in one rotational direction or the other, while observing the crystal through the optical system 12. If, during such rotation, the selected edge of the crystal 10 tends to move away from alignment with the reference line or graticule 45, it is brought back into such alignment by further adjusting of the appropriate adjustment block 31, 32, 33 or 34. These steps are illustrated by Figures 13 and 13a, respectively. This rotation, observation and adjustment is continued until the selected edge remains in proper relative position with respect to the graticule 45 through an entire 360° rotation of the adjustment core 28, whereupon the selected axis of said crystal will then necessarily be coincident with the reference axis 30 of the apparatus.

With the reference axis of the crystal coincident with the axis 30 of the apparatus, the operator will move the crystal support device 11 axially as necessary to position the crystal in alignment with the axis of the collimator 18 and he can then proceed directly and without further adjustment to the exposing of the X-ray film. Such adjustments can normally be accomplished by a trained operator of the apparatus in a matter of minutes, whereas the previous methods of accomplishing this coincidence of the selected crystallographic axis and the reference axis required hours, and sometimes days, to accomplish.

The optics support 38a is now removed from the skid 37 and the film holder support 38 is placed thereon. The film 17, disposed within the cylindrical shell 54, will have its inner surface 56 substantially equidistant at all points from said reference axis 30 when said film holder 16 is properly supported upon the skid 37. Thus, since the selected crystallographic axis of the crystal 10 has already been placed in coincidence with the reference axis 30, said axis will, therefore, also be in coincidence with the lengthwise axis of the film 17. Accordingly, X-ray radiation may be caused to pass from a source, not shown, through the X-ray director tube 18 (Figure 6) into the interior of the cylindrical shell 54 where it will strike the crystal 10 and be directed against the sensitized surface 56 of the film. The crystal 10 may be rotated by the core 28 into successive positions, while the film holder is moved lengthwise into respectively successive positions, either continuously or stepwise as desired and as is known in conventional practice, for the obtaining of a series of desired patterns upon the sensitized surface of the film 17, from which the structure of the crystal 10 may be determined in a conventional manner.

After a film is exposed, the film holder and film are then removed from the apparatus 9 and replaced by the optics support 38a, including the parts mounted thereon, for re-examining the crystal 10 and locating another crystallographic axis thereof in a position of coincidence with the reference axis 30. Such effecting of coincidence between the newly selected axis and the reference axis 30 is accomplishd in substantially the same manner as discussed in detail hereinabove, after which the optics support 38a is removed and again replaced by the film holder support 38. This procedure may be repeated as often as is required or desired in substantially the same manner set forth with respect to the first selected axis of said crystal.

The foregoing description of the invention has proceeded on the basis that visible light will be produced by the source 14 and utilized to locate the crystal, as such will in fact be the normal and usual use of the apparatus as it is now contemplated. However, it will be understood that in certain instances, such as in handling crystals which are opaque to visible light, as germanium, the light source 14 will be adapted to produce other types of electromagnetic radiation, as infrared radiation for studying germanium or other radiations for other purposes, and the optical system will then be fitted with any suitable detector, preferably one converting the invisible radiation passing through the crystal continuously to visible radiation.

Although a particular, preferred embodiment of the invention has been described hereinabove for illustrative purposes, it will be recognized that modifications or variations thereof, which do not depart from the scope of such disclosure are fully contemplated unless specifically stated to the contrary in the appended claims.

We claim:

1. A method of positioning a selected axis of a crystal in coincidence with a reference axis, comprising the steps: visually positioning said crystal in approximately the position desired; selecting a point of examination and positioning a graticule parallel to said reference axis and passing through a line extending from said point to said reference axis; visually observing said crystal from said point; rotating said crystal about said reference axis and adjusting the position of said crystal with respect to said reference axis to bring said selected axis in line with said graticule; and continuing said visual observation, said rotating and said adjusting until said crystal can be rotated through 360° about said reference axis with said selected axis remaining continuously aligned with said graticule.

2. The method of determining crystal structure by X-ray measurements, comprising the steps: visually positioning said crystal with a selected axis thereof approximately parallel with a reference axis; selecting a point of examination and positioning a graticule parallel to said reference axis and passing through a line extending from said point to said reference axis; visually observing said crystal from said point; rotating said crystal about said reference axis and adjusting the position of said crystal with respect to said reference axis to bring said selected axis in line with said graticule; continuing said visual observation, said rotating and said adjusting until said crystal can be rotated through 360° about said reference axis with its said selected axis remaining aligned with said graticule; subjecting said crystal to a beam of X-rays and exposing a selected number of X-ray sensitive films by the X-rays diffracted from said crystal with said crystal in a selected number of positions, without movement of said crystal excepting for rotation about said selected axis.

3. A method for causing a selected axis of a crystal to coincide with a reference axis in space, comprising the steps: locating said crystal in said space with said selected axis in approximately the desired position; selecting a point of visual examination spaced from said reference axis; positioning a visible reference line parallel with said reference axis and passing through the line of sight between said point and said crystal; magnifying and illuminating the view of said crystal from said point; adjusting said crystal until said selected axis is aligned with said reference line as observed from said point; rotating said crystal about said reference axis and adjusting the position of said crystal with respect to said reference axis while continuing said observing until said crystal can be rotated 360° about said reference axis while maintaining said alignment between said selected axis and said reference line.

4. In a goniometer adapted for the determination of a crystal structure by X-ray measurement, said goniometer having a base, a rotatable crystal holding device capable of micrometer adjustments of said holding device with respect to the axis of rotation thereof, means directing a beam of X-rays through a projected portion of said axis of rotation and adjacent said holding device, and ways for supporting a film holder in a selected position concentric with said axis, the device comprising: a base receivable within said ways; an optical system, said optical system including an eyepiece and a graticule spaced from said eyepiece; means mounting said optical system on said base in such a position that when said base is received within said ways and positioned adjacent said holder, said graticule will be parallel to said axis and a straight line may be passed from the center of said eyepiece through said graticule and through said axis.

5. The device defined in claim 4 including also means directing a beam of illumination at the point where said last named line passes through said axis.

6. Apparatus for positioning a selected axis of a crystal in coincidence with a reference axis, comprising: a base; a crystal holding device rotatable about said reference axis; adjustment means on said device for positioning said selected axis in coincidence with said reference axis; an optical system supported upon said base and having a line of sight passing through said reference axis; and means providing a graticule within said system, parallel with said reference axis, and intersecting said line of sight.

7. The apparatus of claim 6 including a source of light and means directing a beam of said light substantially parallel with said line of sight through the intersection of said reference axis and said line of sight.

8. The apparatus of claim 7 where the said source produces visible light.

9. The apparatus of claim 7 including a source of X-rays and means directing a beam of X-rays at said intersection.

10. The apparatus of claim 9 wherein said light source, said light directing means and said optical system are secured to a single mounting, removable from said base, and wherein said mounting can be replaced by an X-ray sensitive film and holder therefor.

11. In apparatus for use with a Weissenberg goniometer, or similar device, having support structure for removably supporting a film holder and a crystal supporting head adapted for rotation about a reference axis, the combination comprising: a base removably receivable into said support structure; source means providing a beam of light, said source means being arranged on said base and positioned on one side of said reference axis when said base is in position within said support structure; an optical system including a graticule supported on said base and so arranged with respect to said base and said source means that when said base is in position in said support structure said optical system will be on the opposite side of said reference axis from said source means and the field of vision of said optical system will include said reference axis and said graticule will be parallel to said reference axis; said source means and the means comprising said optical system being spaced sufficiently far apart to define such a space that the crystal to be observed and the structure supporting same in observation position may be freely positioned and rotated within said space.

12. In apparatus for use with a Weissenberg goniometer, or similar device, having support structure for removably supporting a film holder and a crystal supporting head adapted for rotation about a reference axis, the combination comprising: a base removably receivable into said support structure; source means providing a beam of light, said source means being arranged on said base and positioned on one side of said reference axis when said base is in position within said support structure, said source means comprising a source of electromagnetic radiation and a first optical system for focusing radiation from said source onto a point on said reference axis and means supporting said source and said optical system in operative position on and with respect to said base; a second optical system including a graticule supported on said base and so arranged with respect to said base and said source means that when said base is in position in said support structure, said optical system will be on the opposite side of said reference axis from said source means and the field of vision of said optical system will include said reference axis and said graticule will be parallel with said reference axis; said source means and the means comprising said optical system being spaced sufficiently far apart to define such a space that the crystal to be observed and the structure supporting same in observation position may be freely positioned and rotated within said space.

13. In apparatus for use with a Weissenberg goniometer, or similar device, having support structure for removably supporting a film holder and a crystal supporting head adapted for rotation about a reference axis, the combination comprising: a base removably receivable into said support structure; source means providing a beam of light, said source means being arranged on said base and positioned on one side of said reference axis when said base is in position within said support structure; an optical system including a graticule supported on said base and so arranged with respect to said base and said source means that when said base is in position in said support structure said optical system will be on the opposite side of said reference axis from said source means and the field of vision of said optical system will include said reference axis and said graticule will be parallel with said reference axis, the path of the light beam approaching said reference axis and said field of vision being substantially coaxial with each other; said source means and the means comprising said optical system being spaced sufficiently far apart to define such a space that the crystal to be observed and the structure supporting same in observation position may be freely positioned and rotated within said space.

14. A method of positioning a selected axis of a crystal in coincidence with a reference axis, comprising the steps: visually positioning said crystal in approximately the position desired; viewing said crystal through an optical system with a graticule in said optical system being positioned parallel with said reference axis; rotating said crystal about said reference axis and adjusting the position of said crystal with respect to said reference axis to bring said selected axis parallel with said graticule; and continuing said viewing, said rotating and said adjusting until said crystal can be rotated through 360° about said reference axis with said selected axis continuously remaining in the same position with respect to said graticule.

References Cited in the file of this patent

UNITED STATES PATENTS

| | | |
|---|---|---|
| 2,383,764 | Bond | Aug. 28, 1945 |
| 2,392,528 | Frankuchen | Jan. 8, 1946 |
| 2,394,622 | Luley | Feb. 12, 1946 |
| 2,430,969 | Young | Nov. 18, 1947 |
| 2,585,916 | Coleman | Feb. 19, 1952 |